United States Patent [19]
Otsuki

[11] Patent Number: 6,164,854
[45] Date of Patent: *Dec. 26, 2000

[54] AUTOMATIC CUTTING DEVICE APPARATUS AND METHOD INCLUDING A REVERSIBLE MOTOR

[75] Inventor: Noboru Otsuki, Nagano, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/057,669

[22] Filed: Apr. 9, 1998

[30] Foreign Application Priority Data

Apr. 9, 1997 [JP] Japan ................................... 9-091203

[51] Int. Cl.⁷ ..................................................... B41J 11/70
[52] U.S. Cl. ......................... 400/621; 318/256; 318/280; 83/601
[58] Field of Search .............................. 400/621; 83/601, 83/602, 603; 318/280, 739, 256

[56] References Cited

U.S. PATENT DOCUMENTS

| | | | |
|---|---|---|---|
| 3,675,525 | 7/1972 | Ellison | 83/629 |
| 5,036,647 | 8/1991 | Taylor et al. | 53/542 |
| 5,315,398 | 5/1994 | Otsuki | 358/304 |
| 5,798,625 | 8/1998 | Tanii et al. | 318/541 |

FOREIGN PATENT DOCUMENTS

| | | |
|---|---|---|
| 0 764 542 | 3/1997 | European Pat. Off. . |
| 94 16 958.6 | 2/1995 | Germany . |
| 56-086081 | 7/1981 | Japan . |
| 57-088884 | 6/1982 | Japan . |
| 58-159695 | 9/1983 | Japan . |
| 4-366670 | 12/1992 | Japan ..................................... 400/621 |
| 5-337876 | 12/1993 | Japan . |
| 5-337877 | 12/1993 | Japan . |
| 6-155372 | 6/1994 | Japan . |
| 6-210590 | 8/1994 | Japan . |
| 7-314386 | 12/1995 | Japan . |
| 8-243984 | 9/1996 | Japan . |
| 93/14937 | 8/1993 | WIPO ..................................... 400/621 |

*Primary Examiner*—John S. Hilten
*Assistant Examiner*—Daniel J. Colilla
*Attorney, Agent, or Firm*—Fish & Richardson P.C.

[57] ABSTRACT

In an embodiment, an automatic cutting device specifically defines the automatic cutting device such that the clutch includes a transmission drive gear being driven by the motor and having a first saw-tooth gear, and a transmission follower gear for transmitting the drive force to the worm, the transmission follower gear having a second saw-tooth gear located at a position corresponding to the first saw-tooth gear, wherein one of the transmission drive gears or the transmission follower gear is axially moveable and urged in such a direction that the first saw-tooth gear and the second saw-tooth gear are brought into meshing engagement with each other.

20 Claims, 7 Drawing Sheets

AUTOMATIC CUTTING DEVICE APPARATUS AND METHOD INCLUDING A REVERSIBLE MOTOR

BACKGROUND OF THE INVENTION

1. Field of the Invention

The present invention relates to a printer for printing on cutforms, for example. More particularly, the invention relates to an automatic cutting device using a worm gear in a power transmission mechanism for transmitting a drive force by a motor to a movable blade.

2. Related Art

In a conventional automatic cutting device of this type, a combination of spur gears is used for reducing the number of revolutions of a drive motor in a power transmission mechanism for transmitting a blade drive force to a movable blade.

A recent technical and market of the automatic cutting device trends to device-size reduction and simplification of the power transmission mechanism. The trend pressurizes designers to employ the worm gear for a remarkable motor speed reduction purpose in the power transmission mechanism of the automatic cutting device.

The prior automatic cutting device using the worm gear, i.e., the combination of a worm and a worm wheel, suffers from the following problem.

Sometimes a foreign matter, e.g., a clip, drops on a moving path of the movable blade, and it stops the blade. When the blade is stopped, an inertia of the power transmission mechanism acts to urge the worm so as to move in the axial direction thereof, and the worm wheel is urged so as to be pressed against the peripheral outer surface of the rotary shaft thereof since the rotation axes of the worm and the worm wheel are perpendicular to each other. Further, the worm and the worm wheel are both moved by the rotation drive force by the motor in the same direction as by the inertia.

Therefore, the worm is pressed against a contact part of the frame where it supports the rotary shaft of the worm by a large force, and its rotation is stopped. That is, the worm is locked.

In the locked state of the worm, the rotation of the motor in one direction is impeded by the foreignmatter, while its rotation in the other direction is impeded by a frictional force generated between the worm and the frame contact part when the worm is pressed against the contact part. In this condition, therefore, it is impossible to remove the locked state by the utilization of the motor. A technique to remove the foreign matter is disclosed in Japanese Patent Laid-Open Publication No. Hei-5-337877. The technique turns the worm shaft by use of a proper tool or turns an added, rotatable gear by the finger to thereby retract the movable blade.

Thus, the manual work to return the movable blade to its home position is inevitable in the prior device. The handling of the automatic cutting device is poor.

SUMMARY OF THE INVENTION

The present invention is directed to solve the above problem, and to provide an automatic cutting device which enables the locked movable blade to be released from its locked state in an easy manner.

An aspect of the present invention, there is provided an automatic cutting device including: a reversible motor; a movable blade for cutting a printing medium; power transmission mechanism including a worm and a worm wheel in meshing engagement with the worm, the power transmission mechanism moving the movable blade from a stand-by position to a cutting position through a forward rotation of the reversible motor; and motor control means for switching the direction of rotation of the reversible motor between a forward direction and a reverse direction, when the reversible motor is turned in the reverse direction, the motor control unit driving the reversible motor by a larger force than when the motor is turned in the forward direction, or the power transmission mechanism transmitting a large drive force to the movable blade. When the movable blade is locked, a frictional load generated in the power transmission means is larger as the drive force is larger.

The automatic cutting device thus constructed drives the movable blade by a relatively small force in a normal state, whereby a frictional force in the anomalous state is reduced. In the anomalous state, the drive motor is turned in the reverse direction.

The drive force produced by the reversely turning motor is larger than by the forwardly turning motor. The large drive force overcomes the frictional load to allow the movable blade to return to its stand-by position.

Another aspect of the present invention, an automatic cutting device specifically defines the automatic cutting device such that the transmission means includes a clutch, located between the reversible motor and the worm, a magnitude of the drive force transmitted by the clutch varies depending on the direction of rotation of the reversible motor. The clutch functions as a torque limiter. Therefore, if the movable blade is locked, the motor continues its turning. The result is to eliminates the influence of the inertia by the rotating means, e.g., the drive motor, upon the frictional force and to prevent the motor from being damaged.

Another aspect of the present invention, an automatic cutting device specifically defines the automatic cutting device such that the clutch includes a transmission drive gear being driven by the motor and having a first saw-tooth gear, and a transmission follower gear for transmitting the drive force to the worm, the transmission follower gear having a second saw-tooth gear located at a position corresponding to the first saw-tooth gear, wherein one of the transmission drive gear or the transmission follower gear is axially movable and urged in such a direction that the first saw-tooth gear and the second saw-tooth gear are brought into meshing engagement with each other.

With the construction of the automatic cutting device in the present invention, even if the driven gear is blocked in its rotation, the angles of the sloped surfaces of the gear teeth of the driven member allows the driven gear to axially move apart from the drive bear and hence to rotate relative to the latter. This technical feature implies simplification of the related mechanism, and reduction of cost to manufacture. The torque is determined by the urging spring force, the angles of the sloped surfaces of the gear tooth, and related frictional coefficient. Therefore, the torque control is very easy if the angles of the sloped surface angles and the quality of the gear material are varied properly.

Another aspect of the present invention, an automatic cutting device further specifies such that some gear teeth are omitted in the circular saw-tooth array of each of the saw-tooth gears.

With this technical feature, when the motor is turned in the reverse direction after the movable blade is locked, the transmission drive gear slightly turns and its meshing engagement is set up. At the meshing engagement, the inertia by the motor and that by the transmission drive gear acts on the transmission follower gear to turn it. The torque the drive motor must generate when it is reversely turned is reduced by a corresponding amount. This feature leads to motor size reduction and power consumption reduction.

Another aspect of the present invention, an automatic cutting device specifically defines such that the clutch is a clutch spring including a drive member driven by the reversible motor, a driven member coupled with the worm, an arm having a coiled part and engaging the drive member, the arm being disposed pressing the peripheral outer surface of the driven member, when the reversible motor is turned in the forward direction, the coiled part of the arm being loosened. The structure described above uses the sliding of the coiled part. The resultant advantages are smooth and quiet operation of the device and saving of the required space.

Another aspect of the present invention, an automatic cutting device specifically defines the automatic cutting device such that the motor control means increases a current fed to the reversible motor when the reversible motor is turned in the reverse direction as compared when the reversible motor is turned in the forward direction.

The technical feature enables the worm to be turned by a torque larger than the transmitted torque. Therefore, even if a frictional load caused by distortion energy is present as the result of the abrupt stopping of the movable blade, the blade will return to its original position high probably since the reverse turn torque is large. The result is that when the motor is reversely turned, the worm wheel is reversely turned, and the movable blade is returned to its home position.

Another aspect of the present invention, an automatic cutting device specifically defines the automatic cutting device set forth in claim 6 such that the motor control means increases a voltage applied fed to the reversible motor when the reversible motor is turned in the reverse direction as compared when the reversible motor is turned in the forward direction. The feature described above provides an easy varying of the current fed to the motor.

Another aspect of the present invention, an automatic cutting device specifically defines such that the motor control means connects a resistor in series to a motor drive circuit when the reversible motor is turned in the forward direction.

Use of the resistor, which reduces the current fed to the motor, produces a drive torque by the motor when it is reversely turned by the utilization of a reduced number of required component parts.

Another aspect of the present invention, an automatic cutting device further specifies such that the motor control means includes a current restricting circuit for restricting a current fed into the reversible motor when the reversible motor is turned in the forward direction.

Provision of the current restricting circuit make it easy to control the current fed to the motor.

Another aspect of the present invention, an automatic cutting device further specifies the automatic cutting device defines a printer including a printer body; a print head, provided in the printer body, for printing on a printing medium in a desired fashion; and the automatic cutting device specified described above.

The drive motor, when locked, can be released from its locked state by merely reversely turning the motor. Therefore, the work to remove the locking of the movable blade is very easy when comparing the conventional device in which the movable blade is manually returned to the home position for the locking removal.

DETAILED DESCRIPTION OF THE PREFERRED EMBODIMENTS

A printer which is a first embodiment of the present invention will be described with reference to the accompanying drawing.

Figure 1:
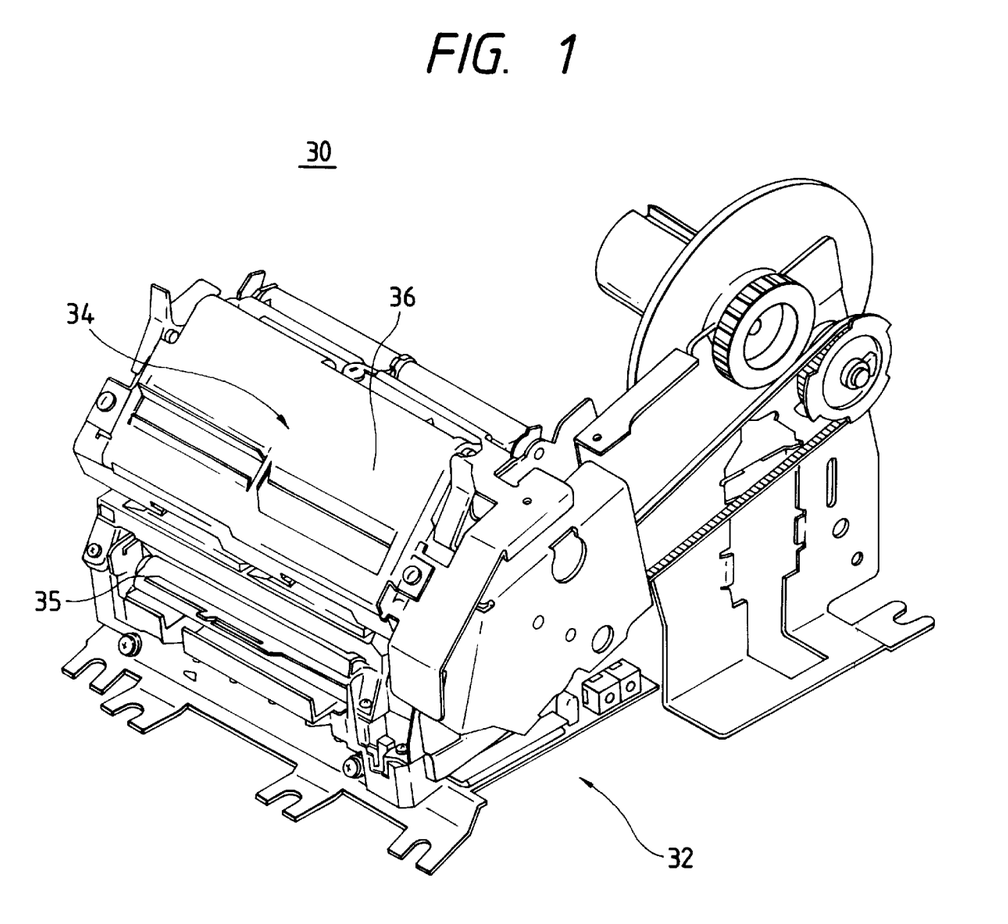
FIG. 1 is a perspective view showing an external appearance of a printer constructed according to the present invention.

FIG. 1 is a perspective view showing an external appearance of the printer of the first embodiment.

As shown, the printer designated by reference numeral 30 is a printer of a type-ring select type, which is used for the electronic cash registers in a POS system. The printer 30 is composed of a printer body 32 and a paper supplying section disposed on the rear side of the printer body 32. An ink roll 35 is attached to and detached from the printer body 32.

The printer body 32 includes a print head (not shown) having type rings for printing on a printing medium, a paper feeding mechanism (not shown) for feeding printing media, e.g., papers, to a printing position, and an automatic cutting device 34 for cutting a printed paper.

The cutting device 34 is located above the printer body 32 and has a construction as described hereunder.

Figure 2:
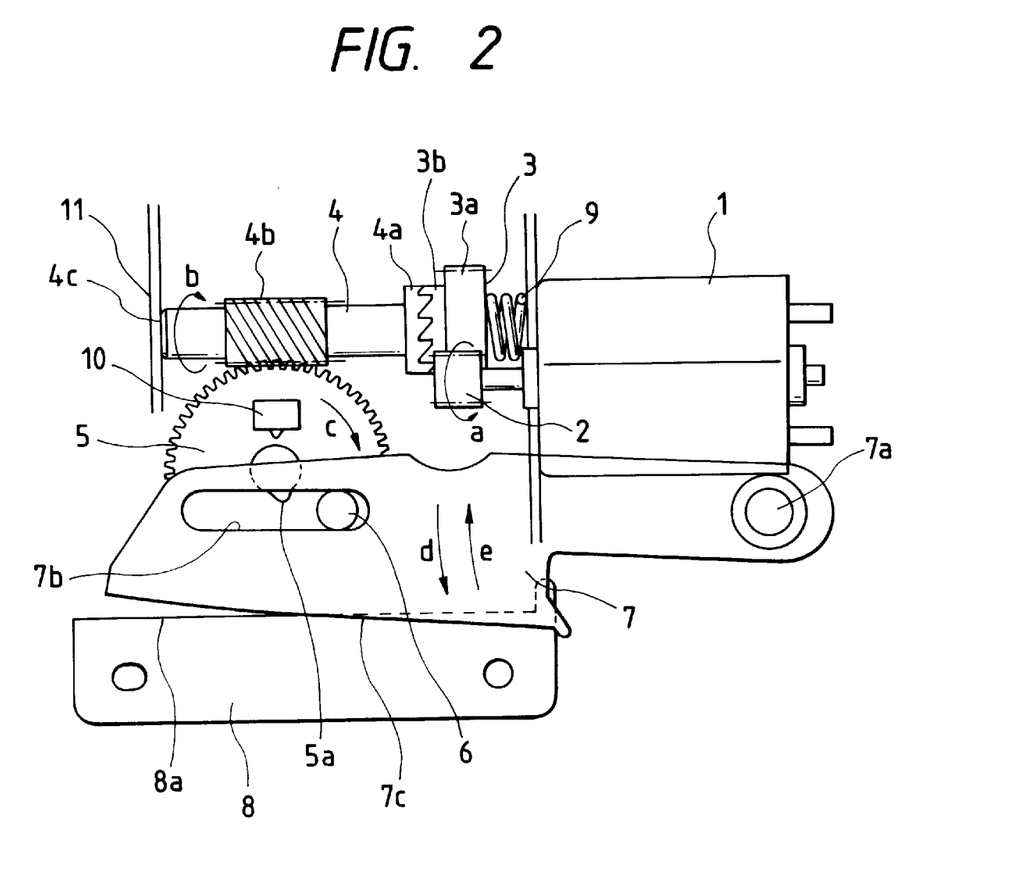
FIG. 2 is a side view schematically showing a cutter mechanism of an automatic cutting device which is also constructed according to the present invention.
Figure 3:
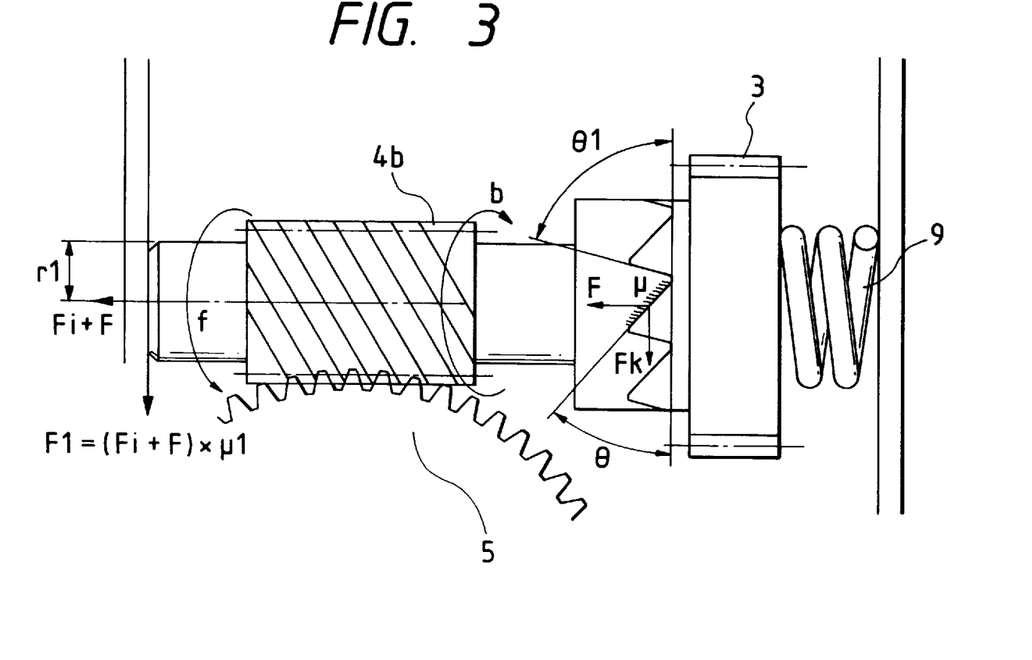
FIG. 3 is a side view showing a clutch incorporated into the automatic cutting device of the invention, the clutch being in a clutched state.

The automatic cutting device 34 is schematically illustrated in FIG. 2. In the figure, numeral 1 is a motor as a drive source; 2 is a motor gear as a spur gear; 3 is a transmission gear; 3a is a gear wheel; 3b is a first saw-tooth gear; 4 is a worm shaft; 4a is a second saw-tooth gear; 4b is a worm; 4c is a contact part; 5 is a helical gear; 5a is a cam part; 5b is a shaft; 6 is an blade drive pin; 7 is a movable blade; 7a is a shaft; 7b is an elongated hole; 7c is an edge; 8 is a stationary blade; 8a is an edge; 9 is a compression coiled spring; 10 is a detector; and 11 is a frame. The motor gear 2 is firmly attached to the motor shaft such that it is immovable in the rotation direction. The transmission gear 3, which is driven by the motor 1, includes the gear wheel 3a and the first saw-tooth gear 3b. The gear wheel 3a and the first saw-tooth gear 3b are molded into one piece construction. The thus constructed wheel and gear combination, or the transmission gear 3, is mounted while being movable in the center of rotation thereof. The gear wheel 3a is in mesh with the motor gear 2. The worm shaft 4 includes the second saw-tooth gear 4a and the worm 4b. The second saw-tooth gear 4a and the worm 4b are molded into one piece construction. The second saw-tooth gear 4a is in meshing engagement with the first saw-tooth gear 3b. The center of rotation of the worm shaft 4 is aligned with that of the transmission gear 3. One end (contact part 4c) of the worm shaft 4 is brought into contact with the frame 11, and held by the same. The helical gear 5 is rotatably supported by a shaft 5a and in meshing engagement with the worm 4b of the worm shaft 4. The blade drive pin 6 is fastened onto the helical gear 5, and slidably engages with the movable blade 7. The movable blade 7 may be turned about the shaft 7a, and has an elongated hole 7b and an edge 7c. The blade drive pin 6 is inserted into the elongated hole 7b of the movable blade 7. The edge 7c of the movable blade 7 is angularly movable on and along the edge 8a of the stationary blade 8. The compression coiled spring 9 urges the transmission gear 3 so that the first saw-tooth gear 3b thereof is brought into engagement with the second saw-tooth gear 4a of the worm shaft 4. The detector 10 is pushed by a cam part 5a of the helical gear 5, and used for detecting a rotation position of the blade drive pin 6. FIG. 3 is an explanatory diagram useful in explaining a relationship of forces in the automatic cutting device when the transmission gear 3 is coupled with the worm shaft 4.

The operation of the thus constructed automatic cutting device 34 will be described with reference to FIGS. 2 and 3.

The motor 1, when driven, rotates in the direction of an arrow a; the motor gear 2 turns in the same direction; the transmission gear 3, which engages with the motor gear 2, turns in the direction of an arrow b; the worm shaft 4, which engages with the transmission gear 3, turns also in the direction b; and the helical gear 5 turns in the direction of an arrow c. In the drive force transmission, the number of revolutions of the motor is considerably reduced by the worm 4b.

With the turning of the helical gear 5, the blade drive pin 6 of the helical gear 5 turns which is inserted into the elongated hole 7b of the movable blade 7. The movable blade 7 is also turned about the shaft 7a in the direction of an arrow d by the turning blade drive pin 6, while at the same time the edge 7c of the movable blade 7 angularly slides on and along the edge 8a of the stationary blade 8. Through the angular movement of the edge 7c relative to the edge 8a, a printing paper (not shown) located between the movable blade 7 and the stationary blade 8 is cut.

The printing paper is supplied from the paper supply mechanism (not shown), transported to a printing position, and subjected to printing, and thereafter cut.

After the paper is cut, the helical gear 5 is further turned in the same direction. When it passes a preset position located in the lower part in the drawing, the movable blade 7 is turned in the direction of an arrow e. The turning helical gear 5 pushes the detector 10 with its campart 5a. Then, the detector 10 produces a signal indicating that the movable blade 7 reaches its home position.

The control unit (not shown) for controlling the driving and the turning direction of the motor 1 receives the signal from the detector 10, and stops the motor 1 and terminates the cutting operation of the automatic cutting device.

When a foreign matter drops on the moving path of the movable blade 7 and the movable blade is stopped, the cutting device 34 operates in the following manner. Reference is made to FIG. 3. A load F by the compression coiled spring 9 couples the first saw-tooth gear 3b of the transmission gear 3 with the second saw-tooth gear 4a of the worm shaft 4. The transmission gear 3 is turned in the direction b by the motor 1, and the worm shaft 4 is also turned since the surfaces of the gear teeth of the first saw-tooth gear 3b, which are sloped at a small angle, are brought into contact with the corresponding ones of the second saw-tooth gear 4a.

The height of the sloped surfaces of the gear teeth of the transmission gear 3 is selected so that the transmission gear is movable horizontally. When the transmission drive gear 3 and worm shaft 4 are both turning in the direction b and the paper cutting progresses, a foreign matter drops on the moving path of the movable blade 7 and it locks the movable blade in its movement. At this time, the worm shaft 4 receives a reaction force Fi to the inertia of, for example, the rotor of the motor 1 from the transmission gear 3.

Further, it receives a reaction force Fk to the drive torque by the motor 1 from the worm shaft 4. When the transmission gear 3 and the worm shaft 4 are in an equilibrium state, the reaction force Fk is expressed by $$Fk=F/\tan(\theta+\text{Atan }\mu)(\text{Atan: arctangent})$$

where θ: angle of the sloped surface

μ: coefficient of friction

When the left side Fk is greater than the right side, the transmission gear 3 moves to the right, and moves over the sloped surfaces of the gear tooth. The transmission gear 3 continues its rotation while the worm shaft 4 stopped since the drive force of the motor 1 is greater than the reaction force Fk.

In the locked state of the movable blade 7, when the motor 1 is reversely turned, the cutting device 34 operates in the following manner. A frictional force F1 present between the frame 11 and the contact part 4c of the worm shaft 4 is given by $$F1=(Fi+F)\times\mu 1$$

A frictional torque T1 therebetween is $$T1=F1\times r1$$

where r1: radius of the contact part 4c of the worm shaft 4.

In the present embodiment, the spring load F and an angle θ1 of the steeply sloped surface of the gear teeth are selected so as to satisfy: Tm>T1 (Tm: starting torque Tm of the motor 1, T1: frictional load torque).

The gear tooth of each of the first and second saw-tooth gears 3b and 4a has two sloped surfaces; one is steep in slope (referred to as a steep slope) and the other is gentle (referred to as a gentle slope). The angles of the steep and gentle slopes are respectively denoted as θ1 and θ (θ1>θ). To cut the printing paper, the gentle slopes of the gear teeth of the first and second saw-tooth gears 3*b* and 4*a* are coupled with each other to thereby transmit the rotational torque of the motor 1 to the movable blade 7. When the movable blade 7 is locked and returned to its home position, the steep slopes of those gear teeth are coupled with each other and the motor 1 is reversed in turn. In this case, the worm shaft 4 is turned in the direction of an arrow f, and in turn the movable blade 7 (FIG. 2) returns to the home position.

Figure 4:
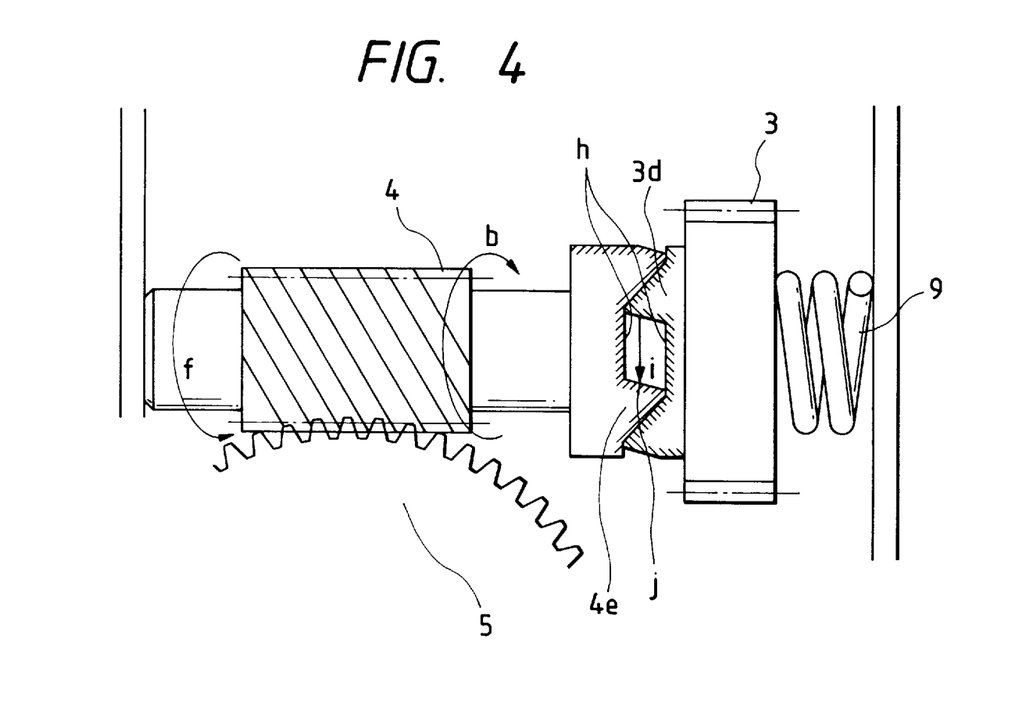
FIG. 4 is a side view showing another clutch available for the automatic cutting device, the clutch being in a clutched state and constituting a second embodiment of the present invention.

Another automatic cutting device constructed according to the present invention will be described with reference to FIG. 4. As shown, when the transmission gear 3 and the worm shaft 4 are coupled with each other, the first and second saw-tooth gears 3*b* and 4*a* are loosely coupled in their rotational direction. The remaining structure of the FIG. 4 cutting device is substantially the same as of the FIGS. 2 and 3 cutting device.

In cutting the printing paper by the movable blade 7, the transmission gear 3 and the worm shaft 4 are coupled in the same manner as in the FIGS. 2 and 3 cutting device. When the movable blade 7 is locked and the motor 1 is reversely turned, the first saw-tooth gear 3*d* of the transmission gear 3 moves in the direction of an arrow j into meshing engagement with the second saw-tooth gear 4*e* of the worm shaft 4.

When the first saw-tooth gear 3*d* is brought into engagement with the second saw-tooth gear 4*e*, the sum of the drive force by the motor 1 and an inertia by rotating means, e.g., the rotor of the motor acts on the second saw-tooth gear 4*e* of the worm shaft 4. This makes it easy for the worm shaft 4 to turn in the direction f.

In other words, the torque that must be produced by the motor may be reduced by a quantity corresponding to the inertia. This fact accrues to the reduction of the motor size and power consumed by the motor.

An additional automatic cutting device constructed according to the present invention (third embodiment of the invention) will be described with reference to FIGS. 5 through 7.

A spring clutch is used in the power transmission mechanism of this third automatic cutting device, while the saw-tooth clutch gears are used in the above-mentioned two automatic cutting devices.

Figure 5:
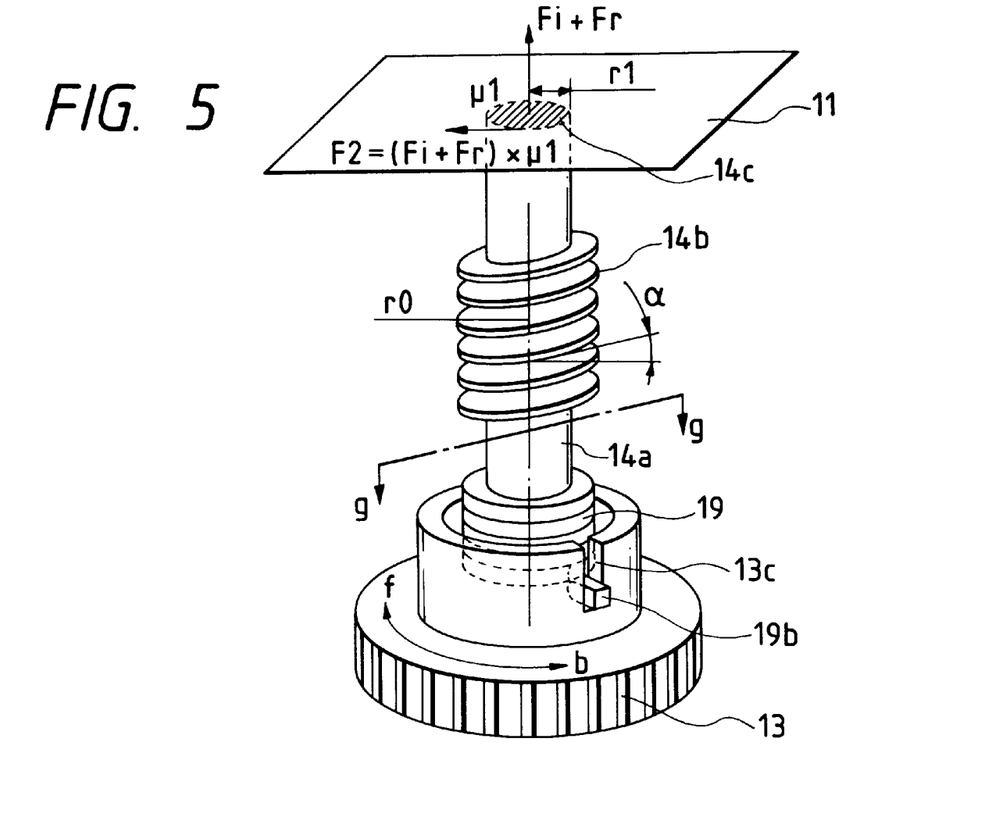
FIG. 5 is a perspective view showing yet another clutch available for the automatic cutting device, the clutch constituting a third embodiment of the present invention.
Figure 6:
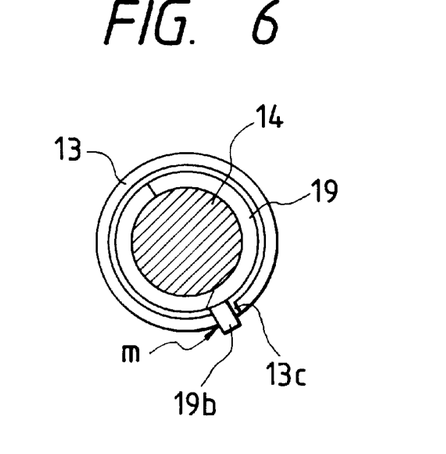
FIG. 6 is a view showing the detail of the clutch of FIG. 5.
Figure 7:
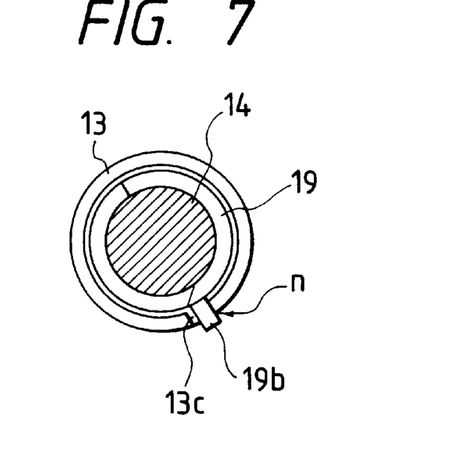
FIG. 7 is another view showing the detail of the clutch of FIG. 5.

An external appearance of the third automatic cutting device is illustrated in perspective form in FIG. 5, and the cross sections each taken on line g—g in FIG. 5 are shown in FIGS. 6 and 7. A twisted coiled spring 19 is wound around an arbor 14*a* of the worm shaft 14, as shown in FIG. 5. The inside diameter of the twisted coiled spring 19 is shorter than the diameter of the arbor 14*a* of the worm shaft 14. The interference of the coupling structure of the twisted coiled spring 19 and the arbor 14*a*, and the number of turns of the twisted coiled spring 19 define a transmission torque and a loosening torque in the clutch mechanism.

A hook 19*b* is provided at one of the ends of the twisted coiled spring 19. It is inserted into a slit 13*c* of the transmission gear 13. When the transmission gear 13 is rotated in the direction b by a motor gear, the twisted coiled spring 19 and the worm shaft 14 are also turned in the same direction. When the movable blade is locked with something to interrupt to the turn of the blade, the worm shaft 14 is stopped in its rotation.

At this time, the transmission gear 13 continues its rotation and transmits the rotational torque by the motor 1 to the subsequent stage in the power transmission mechanism. The slit 13*c* pushes the hook 19*b* of the twisted coiled spring 19 in the direction of an arrow m in FIG. 6. The twisted coiled spring 19 expands its inside diameter to be loosened.

The twisted coiled spring 19 continues its turning while sliding on the peripheral outer surface of the arbor 14*a* of the worm shaft 14.

Let the rotational torque in this situation be a loosening torque Tr, and then a load Fr generated in the axial direction is $$Fr = (Tr/r0) \times \cot(\alpha + \rho)$$

$$\tan(\rho) = \mu 0 / \cos(20°)$$

where r0: pitch circle radius of the worm 14*b*

α: angle of torsion of the worm 14*b*

μ0: coefficient of friction of the worm 14*b* and the helical gear

The load Fr and the load Fi by the inertia by the rotating means, e.g., the rotor of the motor cause a frictional force F2 between the frame 11 and the worm shaft 14, and the frictional force F2 is given by $$F2 = (Fi + Fr) \times \mu 1,$$

and at this time, a torque T2 is given by $$T2 = F2 \times r1$$

In the above two equations, μ1 is the coefficient of friction between the worm shaft 14 and the frame 11, and r1 is the radius of a contact part 14*c* of the worm shaft 14 where the shaft comes in contact with the frame 11. In the embodiment, the motor torque is selected to be larger than the load torque T2.

To return the movable blade to its home position, the motor is reversely turned. When it is so turned, the transmission gear 13 is turned in the direction c, the slit 13*c* of the transmission gear 13 pushes the twisted coiled spring 19 in the direction of an arrow n. The twisted coiled spring 19 reduces its inside diameter to clamp the arbor 14*a* of the worm shaft 14; it turns the worm shaft 14 in the direction f; and the movable blade returns to the home position with the aid of the helical gear being in mesh with the worm 14*b*.

Figure 8:
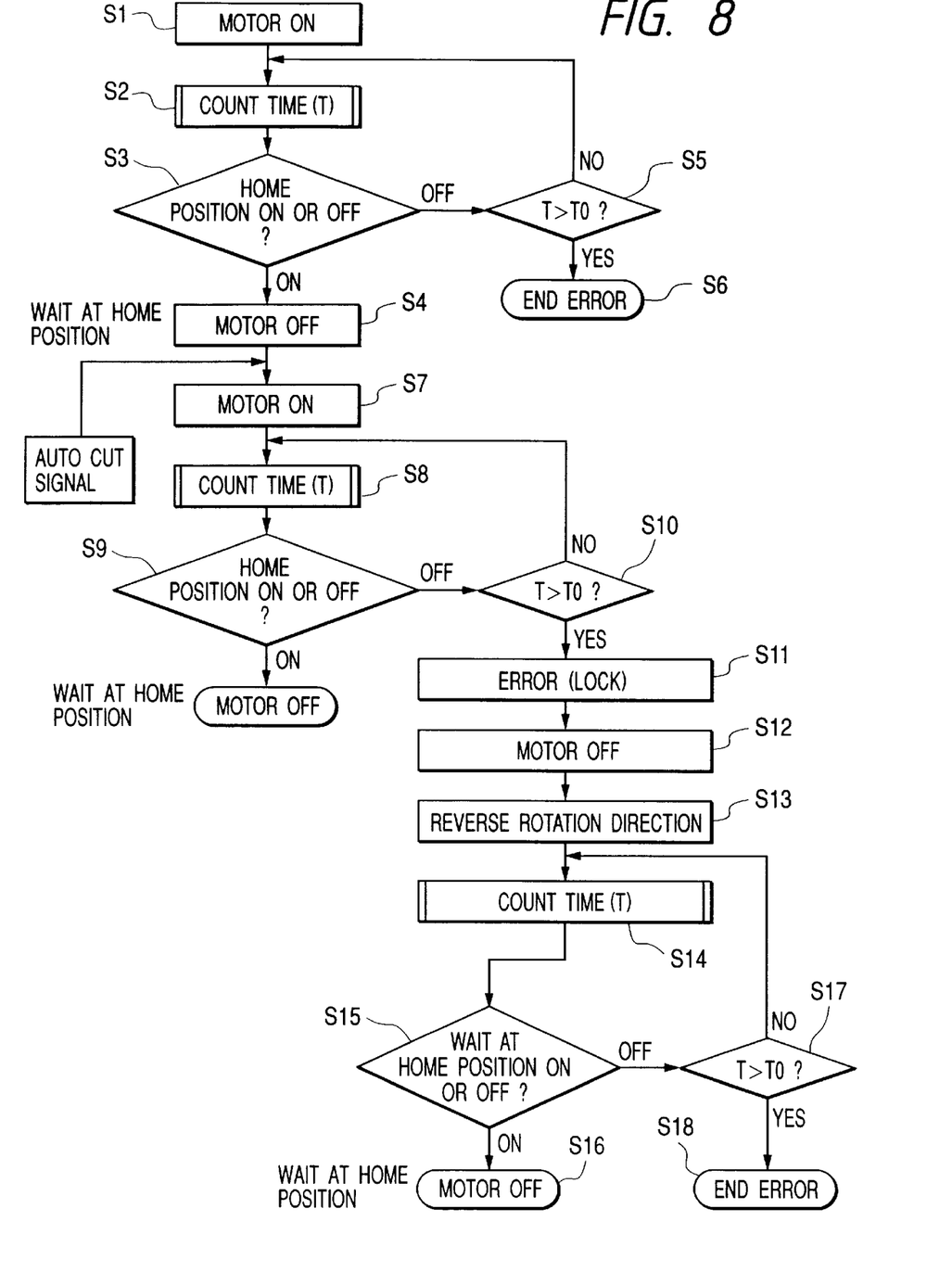
FIG. 8 flow charts a lock detection and an after-locked control.

A locking state detection and an after-locked control in the printer equipped with the automatic cutting device incorporated thereinto will be described with reference to FIGS. 8 and 2.

How to detect a state that the movable blade 7 is locked with something obstructive will first be described. Electric power is supplied to a control system (not shown) contained in the printer, and to the motor 1 (step S1, FIG. 8). At the start of supplying the electric power to the motor, a timer starts time T (step S2).

The system control contained checks if a state of the output signal of the detector 10 is an on or off (step S3) (the detector 10 is for detecting the home position of the movable blade 7). If the output signal is in an on state, the blade is at the home position. Therefore, the system control ceases the supply of electric power to the motor 1; it resets the timer; and it waits for an automatic cutting signal (step S4).

If the output signal is in an off state, control compares a time T count from the start of the power supplying to the motor with a time T0 (time of one cycle plus a margin time) (step S5). If T>T0, the automatic cutting device of the printer is abnormal, and therefore, control stops the supplying of electric power to the motor and displays an error message (step S6). If T<T0, control checks again a state of the output signal of the detector 10 and repeats this.

When in the step S5, control receives an automatic cutting signal, control supplies again electric power to the motor 1 (step S7), and counts time T of power supplying to the motor (step S8). Controls checks if a state of the output signal of the detector 10 is on or off (step S9). If it is on, the movable blade is at the home position. Therefore, control resets the timer and terminates the automatic cutting operation, and waits for the next incoming automatic cutting signal.

If the output signal is in an off state, control checks if T>T0 (step S10). If T<T0, control checks again a state of the output signal of the detector 10, and repeats this. If T>T0, there is a possibility that the movable blade 7 is locked with something obstructive. Then, control stops the power supplying to the motor, and resets the timer (step S12). In this way, a locking state of the movable blade 7 is detected.

A control by the automatic cutting device 34 after the locking state of the movable blade is detected will be described with reference to FIGS. 8 and 9. The motor 1 is rotated in the reverse direction after the supplying of electric power to the motor 1 is stopped (step S13). With the reverse turn, the transmission gear 3, worm shaft 4, and helical gear 5 in the power transmission mechanism are turned in the reverse direction, and the movable blade 7 is also turned in the same direction.

Control commands the timer to count the time of the power supplying to the motor for the reverse turning (step S14), and checks a state of the output signal of the detector 10(step S15). If its state is on, the movable blade is at the home position, and therefore control stops the power supplying to the motor (step S16), and resets the timer. Here, the movable blade 7 is a stand-by state.

If the signal state is off, controls checks again T and T0 (step S17). If T<T0, control returns to a routine to check a signal state of the output signal of the detector 10. If T>T0, something is wrong with the automatic cutting device of the printer. Then, control displays an error message (step S18).

As described above, the automatic cutting device operates: After the error detection, control feeds electric power to the motor 1 to turn in the reverse direction; The movable blade 7 is turned in the direction opposite to the direction of the turning of the movable blade to cut the movable blade 7; and The movable blade 7 is returned to the home position. The automatic cutting device that thus functions has the following advantages. The work of removing the foreign material is easy. After the foreign matter is removed, the automatic cutting device can be restarted immediately, if required. This fact implies that provision of the device initializing time is not required, and hence that the cease time of the automatic cutting device is reduced.

It should be understood that the present invention is not limited to the above-mentioned embodiments, but may variously be modified, altered and changed within the spirits and the scope of the invention.

For example, the power transmission mechanism may be located in the power transmission path ranging from the motor to the worm, while it is located between the transmission gear and the worm shaft in the above-mentioned embodiments.

In an embodiment, an automatic cutting device specifically defines the automatic cutting device such that the clutch includes a transmission drive gear being driven by the motor and having a first saw-tooth gear, and a transmission follower gear for transmitting the drive force to the worm, the transmission follower gear having a second saw-tooth gear located at a position corresponding to the first saw-tooth gear, wherein one of the transmission drive gears or the transmission follower gear is axially moveable and urged in such a direction that the first saw-tooth gear and the second saw-tooth gear are brought into meshing engagement with each other. In the structure, the worm is separated from the worm shaft of the transmission follower gear, while those are constructed in one-piece construction in the embodiments mentioned above. In this case, the worm is mounted on the worm shaft whose cross section is different from that of the worm in such a fashion that the worm is movable in the axial direction of the worm shaft, but is rotatable together with the worm shaft. Also in this case, the worm shaft may be movable, while the transmission gear as the transmission/drive gear is movable in the embodiments already stated.

The present invention may be embodied as illustrated in FIGS. 9 to 12 (fourth to sixth embodiments of the invention).

The embodiments thus far described use a mechanical clutching means located between the motor and the worm for the technical means for coping with the blade locking problem. Some electrical means, for example, means to control a current fed to the motor, may be used for the same purpose.

Figure 9:
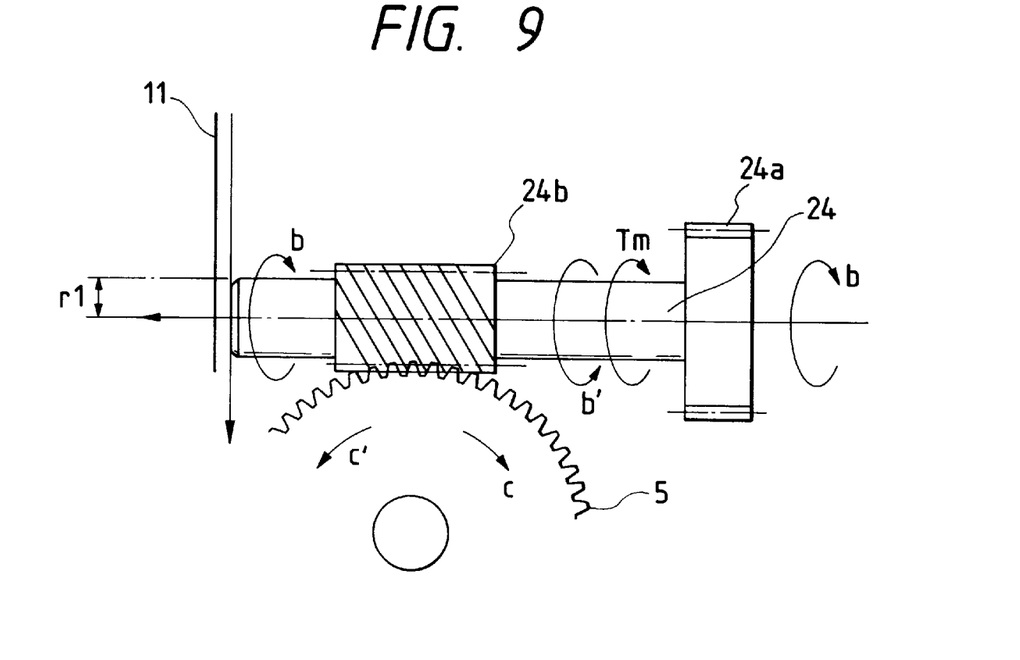
FIG. 9 is a side view showing a worm shaft used in fourth to sixth clutches available for the automatic cutting devices which constitute fourth to sixth embodiments of the invention.

In a structure of an automatic cutting device shown in FIG. 9, a worm shaft 24, a transmission gear 24a, and a worm 24b are molded in one-piece construction. A helical gear 5 is in meshing engagement with the worm 24b of the worm shaft 24. The remaining construction of the automatic cutting device is substantially equal to the corresponding one of the FIG. 2 device.

The transmission gear 24a of the worm shaft 24, which is a gear wheel of the spur gear, is in mesh with the motor gear 2, and the worm 24b thereof is in mesh with the helical gear 5. The worm shaft 24 is axially immovable in this state. The worm shaft 24 is turned by the motor 1 as in the case of FIG. 2.

Figure 10:
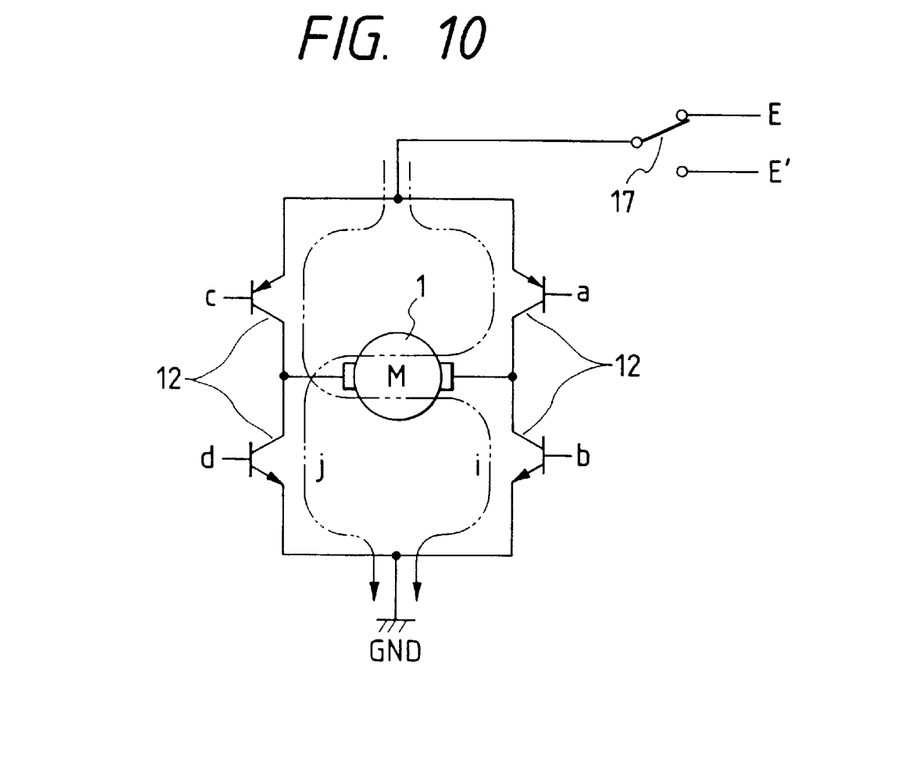
FIG. 10 is a circuit diagram showing a motor drive circuit which constitutes the fourth embodiment of the present invention.

A motor drive circuit also constructed according to the present invention is shown in FIG. 10. In the figure, reference numeral 1 is a motor; 12 is motor drive transistors; and 17 is a switch circuit, which is constructed by the utilization of transistors, for example. The switch circuit 17 selectively guides voltage E or E" to the motor 1. E>E'.

In a forward turn of the motor 1, an on signal is applied to the bases a and d of the motor drive transistors 12, and an off signal is applied to the bases of the transistors. In this circuit, current flows in the direction of an arrow j, and voltage E' is selected and applied to the motor 1. In a reverse turn of the motor, an on signal is applied to the bases c and b of the transistors 12 and an off signal is applied to the bases a and d of the same. Current flows in the direction of an arrow i, and voltage E is selected and applied to the motor 1. Thus, the switch circuit 17 and the motor drive transistors 12 are operated in an interlocking manner. In connection with the time T0, Te<Te' where Te is a motor torque when the voltage E is applied to the motor, and Te' is a motor torque when the voltage E' is applied to the motor. By properly selecting the voltage E or E', it rotates with a small torque when the printing paper is cut. And when it is locked, a small frictional coefficient load is applied to the contact part between the frame 11 and the worm shaft 24. When the motor 1 is reversely turned, the worm shaft 24 is turned by a large drive torque. The worm shaft 24 shown in FIG. 9 is turned in the direction of arrow b', the helical gear 5 is turned in the direction of an arrow c', and the movable blade 7 is returned to the home position.

Figure 11:
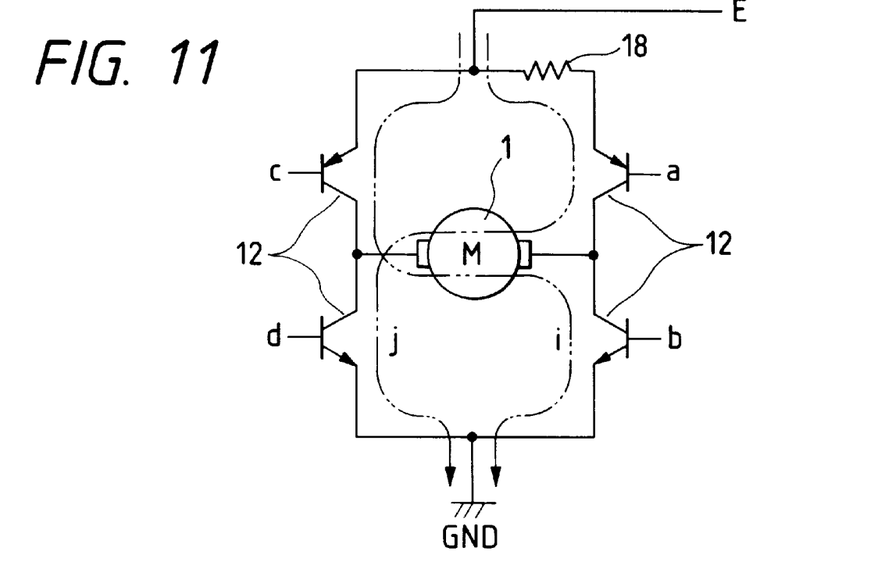
FIG. 11 is a circuit diagram showing a motor drive circuit which constitutes the fifth embodiment of the present invention.

Another motor drive circuit constructed according to the present invention will be described with reference to FIG. 11. Numeral 18 is a resistor. In the forward rotation of the motor, an on signal is applied to the bases a and d of the transistors 12, and an off signal is applied to the bases b and c of the same. Current flows in the direction j. In the reverse rotation of the motor, an on signal is applied to the bases c and b of the motor drive transistors 12, and an off signal is applied to the bases a and d of the transistors. Current flows in the direction i. The same voltage E is applied to the motor in both the forward and reverse turn modes of the motor, but the resistor 18 restricts the current flowing in the direction j (forward rotation), and therefore, the current for the forward motor rotation is smaller than for the reverse motor rotation.

$$Ti>Tj \text{ (Ti: reverse turn torque, Tj: forward turn torque)}$$

Therefore, after the blade is locked, it can be released from its locked state by Ti.

Figure 12:
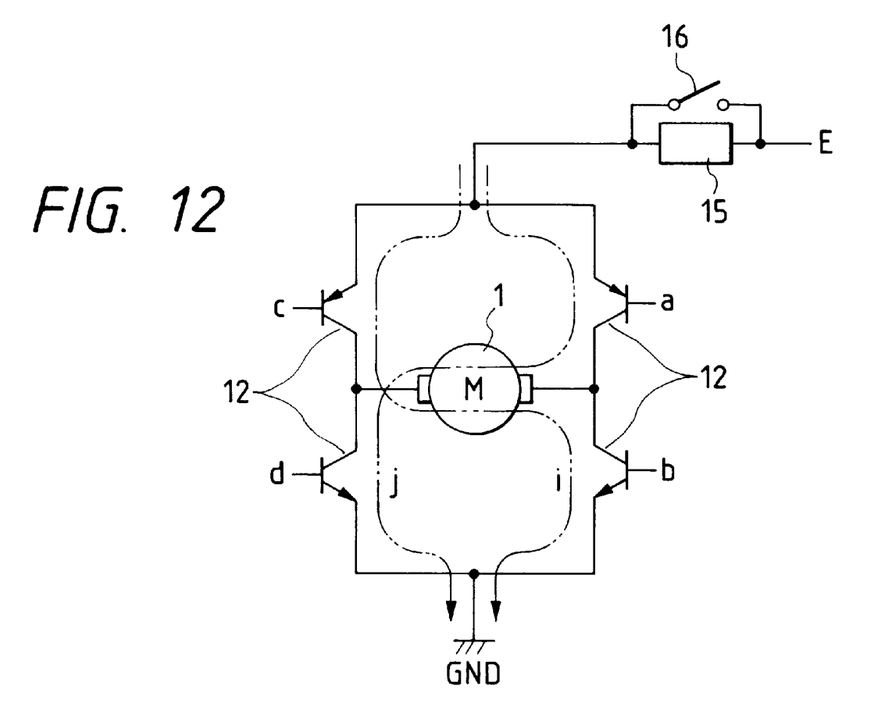
FIG. 12 is a circuit diagram showing a motor drive circuit which constitutes the sixth embodiment of the present invention.

An additional motor drive circuit constructed according to the present invention will be described with reference to FIG. 12. In FIG. 12, reference numeral 15 is a current restricting circuit. The circuit restricts the value of the flowing current to below a predetermined value of current. Numeral 16 is a switch. In the forward turn of the motor, the transistors a and d of the motor drive transistors 12 are turned on and the transistors b and c are turned off. Current flows in the direction j. At this time, the switch 16 is turned off. Current flows into the motor, through the current restricting circuit 15. In the reverse turn, the transistors c and b of the motor drive transistors 12 are turned on and the transistors a and d are turned off. Current flows in the direction of an arrow i. At this time, the switch 16 is turned on. Current by-passes the current restricting circuit 15 and flows into the motor. The same voltage is used for both the forward and the reverse turns. In the forward turn, the current restricting circuit 15 acts and then $$Ts>Tc \text{ (Ts: torque for the reverse turn, Tc: torque for the forward turn)}$$

After the movable blade is locked, the torque for the reverse turn releases the blade from its locked state as in the previous motor drive circuits.

It should be understood that the above-mentioned motor drive circuits are illustrated by way of examples, and the invention may be embodied in various ways. While the switches are used for the voltage selection and for setting up the electrical path to the current restricting circuit, those may be replaced by transistors and their circuitry.

The DC motor, which is used for the drive source in the above-mentioned embodiments, may be replaced with a stepping motor.

In the first embodiment, the clutch as the transmission means and the motor control means may be combined within the scope of the invention. The locking function is enhanced in this case.

While the present invention is applied to the type-ring select type printer in the embodiments, it may be applied to any other suitable printer, for example, dot impact printer, thermal printer, ink jet printer or the like.

Moreover, according to these embodiments described above, there is shown the mechanism for turning back the movable blade within the stand-by position through the stand-by position and the cut position in turn by the forward rotation of the motor. This invention is not limited by the embodiment described above. Of course, it is applicable for employing a mechanism in such a manner that while rotating the motor in the forward direction, the movable blade moves from the stand-by position, and while the motor in the reverse direction, the movable blade moves from the cutting position to the stand-by position so that there is also enjoyed the effect and the advantage of the present invention.

As seen from the foregoing, when a movable blade locking anomaly occurs, a friction load generated by the transmission means is large for a large drive force. Nevertheless, the construction defined by claim 1 angularly moves the movable blade by a small force in a normal state, whereby the frictional load is reduced in the abnormal state. When the motor is reversely turned in the abnormal state, the moving blade can be returned to the home position even if the frictional load is present since the drive force is larger than in the normal state.

In the construction of the present invention, the clutch functions as a torque limiter. Therefore, if the blade locking occurs, the motor continues its rotation; the rotation inertia by the motor, for example, does not affect the frictional load; and the motor is not damaged.

The construction of the present invention enables the worm to be turned by a torque greater than that transmitted if the motor is reversely turned; if the movable blade, for example, is abruptly stopped and a frictional load caused by the distortion energy is present, it can be returned to the original position highly probably since the reverse turn torque is large. Hence, when the motor is reversely turned, the worm wheel is reversely turned and the movable blade is returned to the home position.

What is claimed is:

1. An automatic cutting device comprising:
   a reversible motor;
   a moveable blade for cutting a printing medium;
   power transmission mechanism including a worm and a worm wheel in meshing engagement with said worm, said power transmission mechanism moving said moveable blade from a stand-by position to a cutting position through a forward rotation of said reversible motor; and
   a motor controller for switching the direction of rotation of said reversible motor,
   wherein when said movable blade moves to said stand-by position by a reverse rotation of said motor, said movable blade is driven by a reverse drive power having a magnitude greater than a magnitude of the forward drive power for driving said movable blade by said forward rotation of said reversible motor from said stand-by position to said cutting position.

2. The automatic cutting device according to claim 1, wherein said power transmission mechanism includes a clutch arranged within a transmission path defined between said motor and said worm, said clutch transmits a transmissioin power having a magnitude greater than a magnitude of forward drive power when said motor rotates in said reverse rotation.

3. The automatic cutting device according to claim 2, in which said clutch includes a transmission drive gear being driven by said motor and having a first saw-tooth gear, and a transmission follower gear for transmitting the drive force to said worm, said transmission follower gear having a second saw-tooth gear located at a position corresponding to said first saw-tooth gear, wherein one of said transmission drive gear or said transmission follower gear is axially movable and urged in such a direction th at said first saw-tooth gear and said second saw-tooth gear are brought into meshing engagement with each other.

4. The automatic cutting device according to claim 3, in which some gear teeth are omitted in the circular saw-tooth array of each said saw-tooth gears.

5. The automatic cutting device according to claim 2, in which said clutch is a clutch spring including a drive member driven by said reversible motor, a driven member coupled with said worm, an arm having a coiled part and adapted to engage said drive member.

6. The automatic cutting device according to claim 1, in which said motor controller supplies a current to said reversible motor, said current being increased by said motor controller when said reversible motor is turned in the reverse direction, and said current being decreased when said reversible motor is turned in the forward direction.

7. The automatic cutting device according to claim 6, in which said motor controller supplies a voltage to said reversible motor, said voltage being increased by said motor controller when said reversible motor is turned in the reverse direction, and said voltage being decreased when said reversible motor is turned in the forward direction.

8. The automatic cutting device according to claim 6, in which a resistor is connected in series to a motor drive circuit by said motor controller when said reversible motor is turned in the forward direction.

9. The automatic cutting device according to claim 6, in which said motor controller includes a current restricting circuit for restricting a current fed into said reversible motor when said reversible motor is turned in the forward direction.

10. The automatic cutting device according to claim 1, wherein said motor controller transmits a reverse drive power to said drive said reversible motor in the reverse direction, and transmits a forward drive power to drive said reversible motor in the forward direction, said reverse drive power having a magnitude greater than a magnitude of the forward drive power.

11. A method for controlling an automatic cutting device including a reversible motor, a movable blade for cutting a printing medium, a motor controller, power transmission mechanism including a worm and a worm wheel in meshing engagement with said worm, said power transmission mechanism moving said movable blade from a stand-by position and a cutting position through a forward rotation of said reversible motor, comprising the steps of:

controlling said reversible motor in such a manner that when said reversible motor is turned in the reverse direction, said motor controller drives said reversible motor by a larger drive power than when said motor is turned in the forward direction.

12. A printer comprising:

a printer body;

a print head, provided in said printer body, for printing on a printing medium in a desired fashion;

an automatic cutting device for cutting said printing medium, comprising:
 a reversible motor;
 a moveable blade for cutting a printing medium;
 a power transmission mechanism including a worm and a worm wheel in meshing engagement with said worm, said power transmission mechanism moving said movable blade from a stand-by position to a cutting position through a forward rotation of said reversible motor; and
 a motor controller for switching the direction of rotation of said reverible motor,
 wherein when said movable blade moves to said stand-by position by a reverse rotation of said motor, said movable blade is driven by a reverse drive power having a magnitude greater than a magnitude of the forward drive power for driving said movable blade by said forward rotation of said reversible motor from said stand-by position to said cutting position.

13. The printer according to claim 12, wherein said power transmission mechansim includes a clutch arranged within a transmission path defined between said motor and said worm, said clutch transmits a transmission power having a magnitude greater than a magnitude of forward drive power when said motor rotates in said reverse rotation.

14. The printer according to claim 13, in which said clutch includes a transmission drive gear being driven by said motor and having a first saw-tooth gear, and a transmission follower gear for transmitting the drive force to said worm, said transmission follower gear having a second saw-tooth gear located at a position corresponding to said first saw-tooth gear, wherein one of said transmission drive gear or said transmission follower gear is axially movable and urged in such a direction that said first saw-tooth gear and said second saw-tooth gear are brought into meshing engagement with each other.

15. The printer according to claim 14, in which some gear teeth are omitted in the circular saw-tooth array of each said saw-tooth gears.

16. The printer according to claim 13, in which said clutch is a clutch spring including a drive member driven by said reversible motor, a driven member coupled with said worm, an arm having a coiled part and adapted to engage said drive member.

17. The printer according to claim 12, in which said motor controller supplies a current to said reversible motor, said current being increased by said motor controller when said reversible motor is turned in the reverse direction, and said current being decreased when said reversible motor is turned in the forward direction.

18. The printer according to claim 17, in which said motor controller supplies a voltage to said reversible motor, said voltage being increased by said motor controller when said reversible motor is turned in the reverse direction, and said voltage being decreased when said reversible motor is turned in the forward direction.

19. The printer according to claim 17, in which a resistor is connected in series to a motor drive circuit by said motor controller when said reversible motor is turned in the forward direction.

20. The printer according to claim 17, in which said motor controller includes a current restricting circuit for restricting a current fed into said reversible motor when said reversible motor is turned in the forward direction.

* * * * *